Nov. 16, 1954

I. J. B. SPITZER 2,694,270

ILLUMINATED SIGN

Filed March 27, 1950

INVENTOR
INA JEAN B. SPITZER
BY Rey Eilers
ATTORNEY

Nov. 16, 1954  I. J. B. SPITZER  2,694,270
ILLUMINATED SIGN
Filed March 27, 1950  3 Sheets-Sheet 2
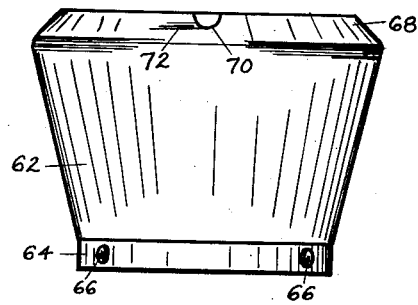
FIG. 7
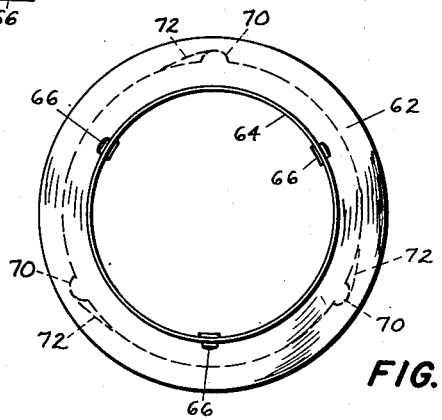
FIG. 9
FIG. 8
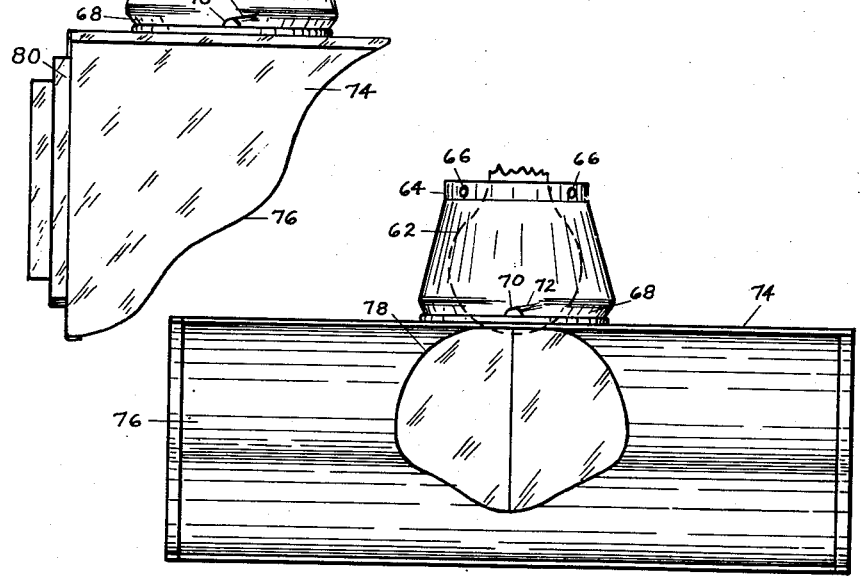
FIG. 10
INVENTOR
INA JEAN B. SPITZER
BY
Ray Eilers
ATTORNEY Nov. 16, 1954  I. J. B. SPITZER  2,694,270
ILLUMINATED SIGN
Filed March 27, 1950  3 Sheets-Sheet 3
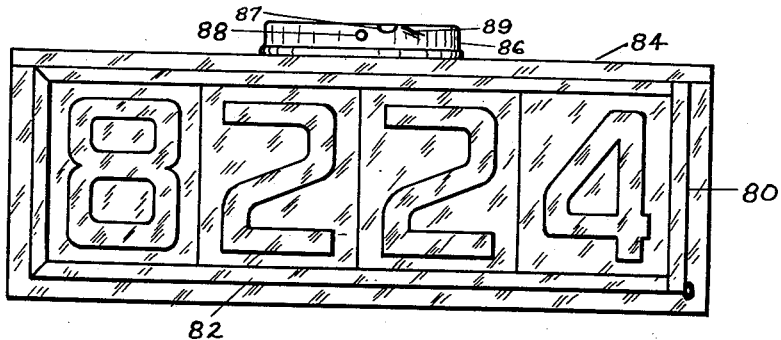
FIG. 11
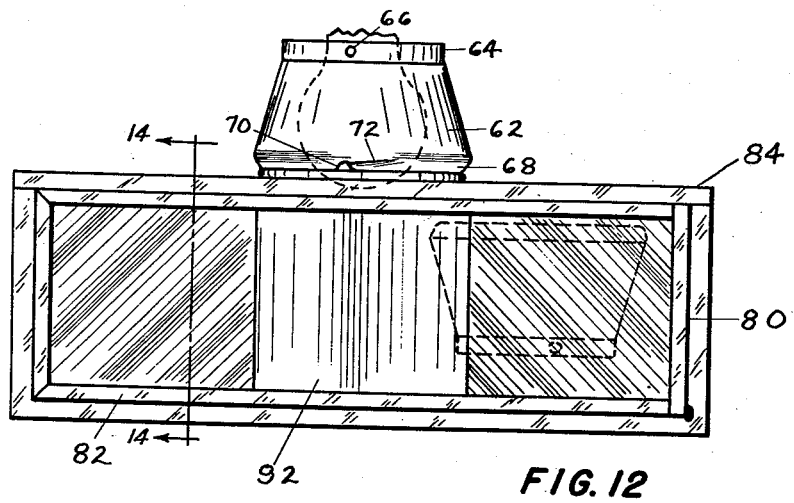
FIG. 12
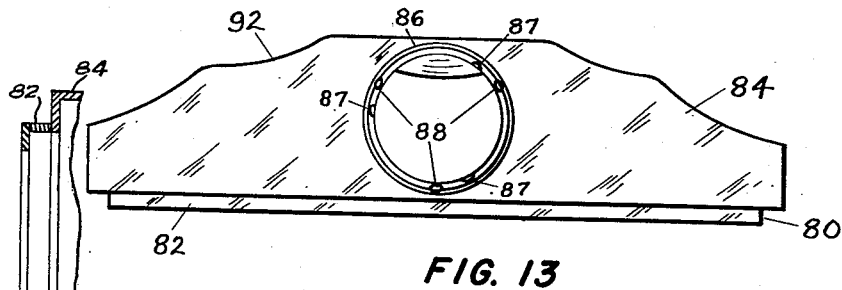
FIG. 13
FIG. 14
INVENTOR
INA JEAN B. SPITZER
BY
Roy Eilers
ATTORNEY

United States Patent Office 2,694,270
Patented Nov. 16, 1954

2,694,270

ILLUMINATED SIGN

Ina Jean B. Spitzer, University City, Mo.

Application March 27, 1950, Serial No. 152,137

8 Claims. (Cl. 40—130)

This invention relates to improvements in illuminated signs. More particularly this invention relates to improvements in illuminated signs and to improvements in methods of making such signs.

The present invention provides interchangeable letters or numerals for illuminated signs which have opaque backgrounds integral therewith and which have light-intercepting, overlapping joints on those backgrounds. By being provided with opaque backgrounds that have light-intercepting, overlapping joints the letters and numerals of the present invention eliminates all need of an opaque coating or mask. As a result, the cost and labor required to form a continuous coating, and the cost and labor required to form an overlying mask are completely eliminated. All that need be done to prepare an illuminated sign from the letters or numerals provided by the present invention is to interfit those letters and numerals in the desired combination. It is therefore an object of the present invention to provide a number of letters or numerals which have opaque backgrounds integral therewith and which have light-intercepting, overlapping joints on those backgrounds, and which can be interchangeably assembled to form illuminated signs.

By using letters and numerals that are made in accordance with the principles and teachings of the present invention, it is possible to make housings for illuminated signs with open front portions, and then selectively insert the required letters or numerals in those open front portions. For example, open front housings can be made for assembly with the exterior lights of buildings, and the open fronts of such housings can be dimensioned to receive groups of numerals indicating the street numbers of those buildings. With such housings and with such numerals, it is a simple matter to form numerals from zero (0) through nine (9) and to dimension those numerals so the desired number of them neatly fit the open fronts of those housings. The selection of the proper combinations of numerals makes it possible to indicate accurately many different street numbers. This decreases the cost of illuminated signs, giving the addresses of buildings, to the point where such signs are practical; because only one size and form of housing need be made, and only numerals from zero (0) through nine (9) need be made.

The collar provided by the present invention is short. Such a collar can be disposed within the illuminated housing during packaging, shipment and storage; and thus the overall size of packages for illuminated housings and collars is no greater than the size of packages required for illuminated housings. It is therefore an object of the present invention to provide a short collar for an illuminated sign housing that can be stored within that housing.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing, Fig. 1 is a perspective view of a numeral and the background integral therewith that are made in accordance with the principles and teachings of the present invention.

Fig. 2 is a cross-sectional, plan view of the numeral and background of Fig. 1, and it is taken along the plane indicated by the line 2—2 of Fig. 1, Fig. 3 is a cross-sectional, schematic plan view of the mold used in making the numeral and background of Figs. 1 and 2, Fig. 4 is a front elevational view of the rear section of the mold shown in Fig. 3.

Fig. 5 is a front elevational view of another numeral and the background integral therewith, Fig. 6 is a cross-sectional, plan view of the numeral and background shown in Fig. 5, and it is taken along the plane indicated by the line 6—6 of Fig. 5, Fig. 7 is a front elevational view of a collar which can be attached to and supported by light brackets on the exteriors of buildings, Fig. 8 is a bottom view of the collar shown in Fig. 7, Fig. 9 is an end elevational view of a housing for an illuminated sign to which the collar of Fig. 7 is attached, Fig. 10 is a rear elevational view of the housing and collar shown in Fig. 9, Fig. 11 is a front elevational view of another form of housing for illuminated sign, Fig. 12 is a front elevational view of the housing of Fig. 11 with a collar attached thereto, and with the numerals removed, the collar also being shown in storage position by dotted lines.

Fig. 13 is a plan view of the housing shown in Figs. 11 and 12, and

Fig. 14 is a sectional end view of the housing of Fig. 13, and it is taken along the plane indicated by the line 14—14 in Fig. 13.

Figure 1:
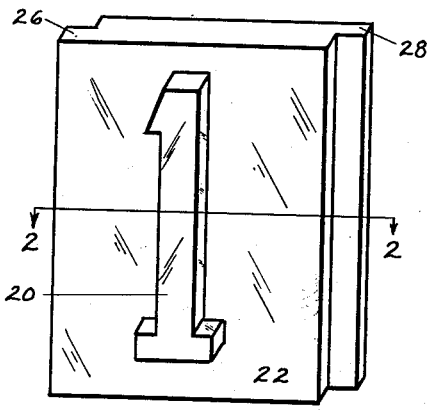
Figure 3:
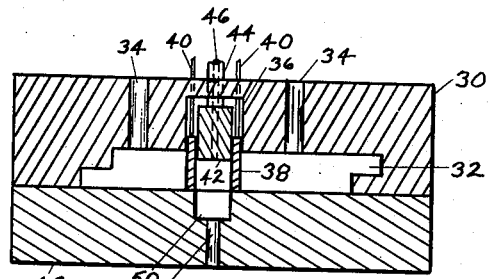

Referring to the drawing in detail, the numeral 20 denotes a body of plastic material with the form and configuration of the numeral one (1); and that body is supported and surrounded by a body 22 of plastic material with the form and configuration of a flat parallelepiped. The body 20 has one degree of light transmissibility and the body 22 has a different degree of light transmissibility; the body 22 serving as a background for the body 20. The body 20 and the background 22 are preferably made of an easily molded material which can be colored to have different degrees of light transmissibility. One such material is an admixture of acetone, acetone cyanohydrin, methanol and methyl methacrylate which is sold under the trade name "Lucite" or "Plexiglas." In some instances the body 20 will be left clear and transparent while the background 22 will be made dark and opaque. In other instances the body 20 will be made dark and opaque while the background 22 will be left clear and transparent. In still other instances colors can be used to attain various contrasting effects between the body 20 and the background 22.

The background 22 has, at one edge thereof, an outwardly-extending, elongated projection 26; and has, at the other edge thereof, an outwardly-extending, elongated projection 28. The projection 26 is flush with the front plane of the background 22, and the projection 28 is flush with the rear plane of the background 22. Each of the projections 26 and 28 is slightly less than one half (½) the thickness of the background 22. The projections 26 and 28 are adapted to engage projections of adjacent backgrounds for numerals or letters, and to coact with those projections to stop light attempting to pass between those backgrounds; the overlapping projections of the adjacent backgrounds preventing a straight-line path between those backgrounds.

Figure 2:
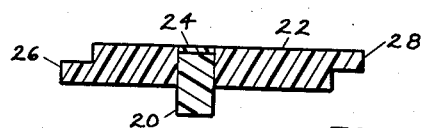

As indicated particularly in Fig. 2, the body 20 does not extend all the way through the background 22. Instead, that body has its rear surface spaced a short distance forwardly of the rear plane of that background. The space between the rear surface of the body 20 and the rear plane of the background 22 will be filled by a body 24 of plastic material. The material of the body 24 will be the same as the material of body 20 and background 22, but it will usually have a degree of light transmissibility which is different from that of the body 20 and the background 22. Where the body 20 is transparent, the body 24 can well be made with a milky color to give a light-diffusing effect. However, the body 24 can be given any desired color.

In the drawing, lines of division are shown between the body 20, the background 22, and the body 24; but those lines merely show a line of division of color and not a line of cleavage in the plastic material. The junctions between the plastic materials of the body 20, the background 22, and the body 24 are inter-molecular in character and are vastly stronger and more permanent than adhesive-held joints.

By forming the background 22 of a plastic material that is homogeneous throughout, the present invention eliminates all of the problems involved in prior methods of painting or masking the backgrounds for letters or numerals. There will be no danger of the background 22 chipping or cracking or of separating from the letter or numeral 20.

Figure 5:
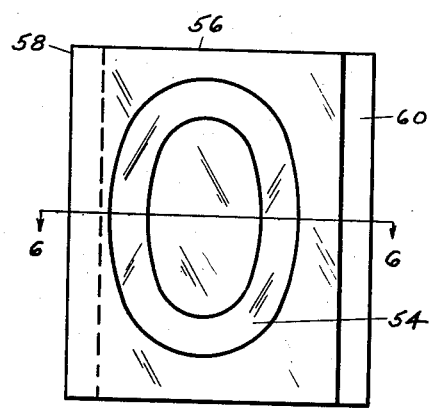
Figure 4:
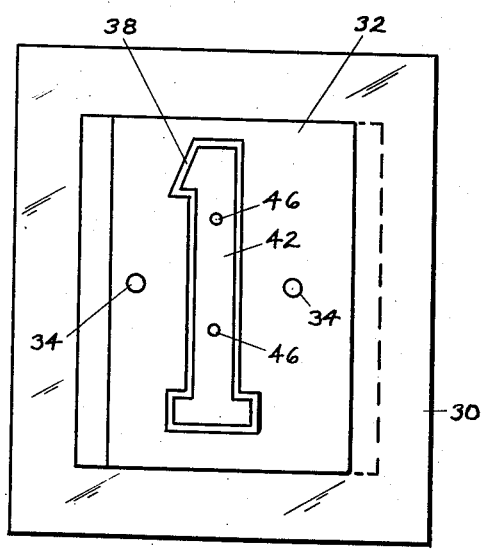
Figure 6:
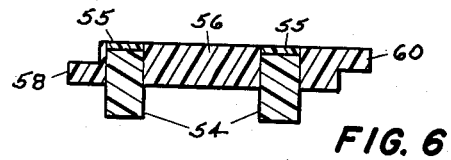

In Figs. 5 and 6, a body 54 and a background 56 are shown; the body and background being of plastic materials of different degrees of light transmissibility. The background 56 has elongated projecting flanges 58 and 60 similar to the flanges 26 and 28 of the background 22 of Figs. 1 and 2. As is the case with the body 20 of Fig. 2, the body 54 does not extend through to the rear plane of the background associated with that body. The space between the rear surface of body 54 and the rear plane of background 56 is filled by the body 55; that body being similar to the body 24 of Fig. 2.

The body 20 is shown as having the form and configuration of the numeral one (1), and the body 54 is shown as having the form and configuration of the numeral zero (0). These two bodies 20 and 54 illustrate the basic types of numerals: those which do not enclose and surround any part of the background, and those which do enclose and surround part of the background. The body 20 is illustrative of the numerals one (1), two (2), three (3), five (5), and seven (7). The body 54 is illustrative of the numerals four (4), six (6), eight (8), nine (9), and zero (0). The only real difference between the molding procedure and apparatus provided for numerals four (4), six (6), eight (8), nine (9) and zero (0) is that additional inlet passages must be provided in the rear wall of the mold to facilitate the introduction of the fluidized material into the areas defined by the closed portions of those numerals; as for example the upper part of the four (4), the lower part of the six (6), both the upper and lower parts of the eight (8), the upper part of the nine (9), and the central part of the zero (0).

By making a number of sets of numerals from zero (0) through nine (9), the present invention is enabled to assemble any desired grouping of numerals; making any one of several thousands of permutations and combinations of numerals possible. In addition, molds can be made to produce letters as well as numerals; the letters "C," "E," "F," "G," "H," "I," "J," "K," "L," "M," "N," "S," "T," "U," "V," "W," "X," "Y," and "Z" being comparable to the body 20, as far as molding procedure is concerned; and the letters "A," "B," "D," "O," "P," "Q," and "R" being comparable to the body 54, as far as molding procedure is concerned. The provision of a few sets of letters and a few sets of numerals makes it possible to display any desired combination of words and numbers. By making the letters with backgrounds of the same size and shape as the backgrounds of the numerals, it is possible to standardize the housings for illuminated signs.

An important field of use for illuminated signs is in indicating the street numbers of buildings and homes. Heretofore this field has been largely closed to illuminated signs because such signs had to be made individually and by hand, and they were thus quite expensive. In addition, it was impractical for sellers to purchase and stock thousands of different signs, as they would have to do to have a sign for each house or building number. Moreover, there was also the problem of securing the illuminated signs to the light brackets of differing sizes on the exteriors of the homes or building. The present invention solves these various problems and thus opens this field for illuminated signs by providing interchangeable numerals, housings that selectively receive desired combinations of those numerals, and reversible collars that can be used to secure those housings to large or small light brackets.

One such collar is denoted by the numeral 62 and it is frusto-conical in form. The collar 62 has an axially-directed flange 64 at one end thereof, and that flange carries a number of buttons 66 thereon. The buttons 66 project radially outwardly beyond the periphery of the axially-directed flange 64. A tapered flange 68 is provided at the other end of the collar 62, and that flange has three notches 70 cut therein. Adjacent the notches 70 are inclined surfaces 72 which are bent into the flange 68.

When the collar 62 is to be secured to a large light bracket for the exterior of a building or home, the flange 68 is telescoped between the retractible screws of that bracket; and then those screws are rotated until they bear against and hold the sides of the collar 62. When the collar 62 is to be used with a small light bracket for the exterior of a building or home, the screws of that bracket will be retracted sufficiently to permit the insertion of the axially-directed flange 64 between those screws and thereafter the screws will be rotated until they tightly engage that flange. In this way, the collar 62 can be releasably and selectively held by both large and small light brackets on the exteriors of buildings or homes.

The opposite ends of the collar 62 are dimensioned to selectively and releasably engage upwardly-projecting rims 86 on housings 74 and 84 for illuminated signs. The collar 62 is dimensioned so the axially-extending flange 64 will telescope within the interiors of the rims 86, and so the tapered flange 68 will telescope over the exteriors of the rims 86. However, if desired, both flanges 64 and 68 could be dimensioned to telescope within the interiors of, or to telescope over the exteriors of, the rims 86. A number of buttons 88 are secured to the exterior surfaces of rims 86, and those buttons have the same spacing as do the notches 70 of the collar 62. Consequently, the notches 70 can be telescoped downwardly over the buttons 88, and then the collar 62 can be rotated to cause the inclined surfaces 72 to engage and be held by those buttons. A number of notches 87 are provided in the rims 86, and those notches are adjacent inclined surfaces 89 formed in the upper ends of rims 86. The notches 87 receive the buttons 66 on the axially-extending flange 64, and the inclined surfaces 89 will engage those buttons and hold the collar 62 against accidental separation from the rims 86. Where both of the flanges 64 and 68 are made so they telescope over the exteriors of rims 86 or telescope within the interiors of those rims, a set of buttons like buttons 66 can be formed on an elongated flange 68, and the notches 70 and the buttons 88 can be eliminated. With these various arrangements, movement of either end of collar 62 into telescoping relation with a rim 86 can be followed by rotation of the collar 62 to secure that collar and rim together in intimate engagement. Separation of the collar 62 from the rim 86 is effected by applying reverse rotation to collar 62, and then lifting that collar away from that rim.

Each of the housings 74 and 84 for illuminated signs is provided with a U-shaped guide and support 82 adjacent the open fronts of those housings. Each of the guides 82 is formed from a number of angles which are secured to the front surfaces of those housings. Those angles are so secured to the housings 74 and 84 that one side of each of the angles projects perpendicularly outwardly from the front surface of the housing 74 or 84 and so the other side of each of the angles lies in a plane which is parallel to but spaced a short distance forwardly of the front surface of the housing. The distance, between the plane in which the other sides of the angles lie and the front surface of the housing 74 or 84, will be just a trifle greater than the thicknesses of the backgrounds of the numerals or letters held by the guides 82. The right hand ends of the guides 82 will normally be closed by a closure 80 suitably secured to the guide 82. Removal of the closure 80 will permit the insertion or removal of the letters or numerals which are to be held by the guide 82.

The openings in the fronts of the housings 74 and 84, and the guides 82, will be so dimensioned that an integral number of letters or numerals will completely fill those openings and those guides. The projecting flange 26 of the numeral or letter at the left hand side of the housings 74 and 84 will extend behind the vertically-directed angle forming the left hand end of the guide 82; the engagement between that flange and that angle preventing leakage of light therebetween. The angles that form the top and bottom of the guide 82 will overlie and cover the tops and bottoms of the background for the letter or numeral and will prevent the escape of light therebetween. The projecting flange 26 of the next letter or numeral will overlie the projecting flange 28 of that first letter and numeral; the engagement between those flanges preventing the escape of light therebetween. Additional letters or numerals can be inserted within the guide 82; the flanges 26 of each of those letters or numerals overlying the flanges 28 of the immediately preceding numerals or letters. The flange 28 of the last letter or numeral in the guide 82 will be overlain and held by the closure 80 of that guide; the engagement between that flange and that closure preventing leakage of light therebetween.

To prepare illuminated signs that give the desired information, it is only necessary to form a plurality of each of the numerals zero (0) through nine (9), form a plurality of letters from A through Z, and then form a plurality of housings of the desired sizes. It is then a simple matter to remove the closure 80, insert the letters or numerals in the desired arrangement, and then replace the closure 80. There will be no need of painting or coating the backgrounds, since those backgrounds have the desired degree of light transmissibility; and there will be no need of masking the joints between those backgrounds since the flanges 26 and 28 are themselves "light stops." Once the letters or numerals are inserted within the guide 82 and the closure 80 set in place, the housing 74 or 84 is ready to be assembled with the collar 62 and to be secured to a light bracket.

Most street numbers of buildings or homes include only four numerals, and only a few street numbers exceed five digits. As a result, it is possible for sellers to stock housings for illuminated signs which can receive four (4) or five (5) numerals, stock a plurality of numerals from zero (0) to nine (9), stock a plurality of letters A, and stock a plurality of blank backgrounds and be able to supply over one hundred thousand (100,000) individually different street numbers. The letters A can be used in a five (5) numeral housing to indicate that the user lives on the second floor of a two-family dwelling. The blank backgrounds can be used where the street number has less than four (4) digits; and those backgrounds will be just like the backgrounds 22 and 56 except that they will be solid throughout and will not carry a letter or numeral.

The housing 74 of Figs. 9 and 10 has an arcuate rear wall 76. A large opening 78 is provided adjacent the center of that rear wall, and that opening will permit much of the light from the lamp which is surrounded by the collar 62 to pass downwardly and out of the housing 74. This opening serves two purposes: first, it facilitates illumination of the platform adjacent the door of the building or home, and second, it minimizes the amount of light which can be reflected toward the innermost letters and numerals held by the housing 74. The arcuate back 76 of the housing 74 will receive light, from the lamp within the collar 62, and will reflect that light forwardly and outwardly toward the outermost letters or numerals held by the housing 74. The combined effect of the opening 78 in reducing reflection of light toward the innermost letters and numerals, and of the arcuate back 76 in reflecting light toward the outermost letters or numerals, makes it possible to attain uniform illumination of all of the letters and numerals; and this, despite the fact that the outermost letters, or numerals are spaced considerably further from the lamp than are the innermost letters, and that the intensity of illumination usually varies inversely with the distance from the source. The housing 74 is dimensioned so it is deep enough that the collar 62 can be disposed within and held by that housing. This makes for compact packing, shipment, and storage of the collar and housing since a package for the housing and collar need be no larger than a package for the housing alone.

Another form of housing for illuminated signs is shown in Figs. 11-13. This housing is denoted by the number 84, and it has an arcuate back which is scalloped in a vertical direction. As indicated particularly in Fig. 12, the scallops in the rear wall 92 of the housing 84 are directed downwardly at the center of the housing and are directed downwardly, outwardly and forwardly adjacent the ends of that back wall. This arrangement provides a series of surfaces which can reflect light, from the lamp within collar 62, dominantly toward the outermost letters or numerals thus assuring even illumination of all of the letters or numerals held by the housing 84. The housing 84 is made deep enough so the collar 62 can be disposed within and held by that housing, as indicated by dotted lines in Fig. 12.

When an individual wishes to obtain an illuminated sign showing his street number, he need only purchase a housing, collar, and four or five numerals, letters, or blank backgrounds. It is then a simple matter to assemble the collar and housing, remove the closure 80, insert the letters, numerals, or blank backgrounds in the proper sequence, replace the closure, and then secure the collar to the light bracket. Such an illuminated sign is not only simple to make and use, but it is inexpensive enough to be practical.

What I claim is:
1. A housing for illuminated signs that comprises a front wall, an opening in said front wall to receive indicia, a back wall, an opening in said back wall, a third wall, an opening in said third wall, and a collar that is adjacent said opening in said third wall and is disposed exteriorly of said third wall, said collar receiving a lamp that can direct light through said opening in said third wall toward said back wall and toward said opening in said front wall.

2. A housing for illuminated signs as claimed in claim 1 wherein the opening in said back wall has the center thereof in register with the center of the opening in said front wall.

3. A housing for illuminated signs as claimed in claim 1 wherein said back wall has a series of curves therein, said curves directing light toward said opening in said front wall.

4. A housing for illuminated signs as claimed in claim 1 wherein said back wall has a series of curves therein, a number of said curves extending downwardly, outwardly and forwardly toward said front wall.

5. A housing for illuminated signs as claimed in claim 1 wherein said back wall has a series of curves therein, said curves extending longitudinally of said back wall, said back wall having the bottom thereof inclined toward said front wall.

6. A housing for illuminated signs as claimed in claim 1 wherein an annular rim extends outwardly from said third wall and surrounds said opening in said third wall, wherein said collar is selectively securable to and separable from said rim, and wherein inter-acting surfaces on said rim and both ends of said collar selectively lock either end of said collar to said rim.

7. A housing for illuminated signs as claimed in claim 1 wherein said opening in said third side is in register with said opening in said back wall.

8. A housing for illuminated signs as claimed in claim 1 wherein said collar is selectively separable from said third wall, said collar being dimensioned to fit wholly within said housing during shipment and storage.

References Cited in the file of this patent
UNITED STATES PATENTS

| Number | Name | Date |
|---|---|---|
| 704,122 | Scott | July 8, 1902 |
| 1,019,414 | Bellamy | Mar. 5, 1912 |
| 1,081,646 | Witz | Dec. 16, 1913 |
| 1,203,566 | Barr | Nov. 7, 1916 |
| 1,359,510 | Kornicker | Nov. 23, 1920 |
| 1,579,936 | Herron | Apr. 6, 1926 |
| 1,601,554 | Bridgham | Sept. 28, 1926 |
| 1,668,590 | Hilfreich | May 8, 1928 |
| 1,739,441 | Clark | Dec. 10, 1929 |
| 1,775,725 | Keith | Sept. 16, 1930 |
| 1,808,456 | Dwyer | June 2, 1931 |
| 1,812,919 | Balder | July 7, 1931 |
| 1,831,181 | Koster | Nov. 10, 1931 |
| 1,898,463 | Nulsen | Feb. 21, 1933 |
| 1,953,784 | Strassner | Apr. 3, 1934 |
| 2,003,089 | Moore | May 28, 1935 |
| 2,021,347 | Bailey | Nov. 19, 1935 |
| 2,147,748 | Miller | Feb. 21, 1939 |
| 2,225,961 | Rundberg | Dec. 24, 1940 |
| 2,245,885 | Webster | June 17, 1941 |
| 2,298,364 | Gits | Oct. 13, 1942 |

FOREIGN PATENTS

| Number | Country | Date |
|---|---|---|
| 593,741 | France | June 6, 1925 |